US012664005B2

(12) United States Patent

Chinnasamy et al.

(10) Patent No.: US 12,664,005 B2

(45) Date of Patent: Jun. 23, 2026

(54) BOT FACTORY ENVIRONMENT

(71) Applicant: AMERICAN EXPRESS TRAVEL RELATED SERVICES COMPANY, INC., New York, NY (US)

(72) Inventors: Baranidharan Chinnasamy, Weston, FL (US); Manjunath Devadi, Weston, FL (US); Chandler Helmuth, Phoenix, AZ (US); Mitchell Kurman, Parkland, FL (US); Vijayakumar Sitha Mohan, Weston, FL (US); Saurabh Pathak, Weston, FL (US); Florian Popescu, Sunrise, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 134 days.

(21) Appl. No.: 18/370,501

(22) Filed: Sep. 20, 2023

(65) Prior Publication Data

US 2024/0012620 A1 Jan. 11, 2024

Related U.S. Application Data

(63) Continuation of application No. 16/261,013, filed on Jan. 29, 2019, now Pat. No. 11,803,355.

(51) Int. Cl.
*G06F 8/34* (2018.01)
*G06F 8/00* (2018.01)
(Continued)

(52) U.S. Cl.
CPC ................ *G06F 9/451* (2018.02); *G06F 8/00* (2013.01); *G06F 8/34* (2013.01); *G06F 8/38* (2013.01);
(Continued)

(58) Field of Classification Search
CPC ........ H04M 3/28; H04L 63/061; H04L 67/02; G06F 8/38; G06F 9/451; H04N 21/4431; G06Q 10/10
See application file for complete search history.

(56) References Cited

U.S. PATENT DOCUMENTS 6,259,969 B1 7/2001 Tackett et al.
6,292,715 B1 9/2001 Rongo
(Continued)

OTHER PUBLICATIONS

JP 5530173 (translation), Jun. 25, 2014, 23 pgs <JP_5530173. pdf>.*

*Primary Examiner* — Tuan A Vu
(74) *Attorney, Agent, or Firm* — Sterne, Kessler, Goldstein & Fox P.L.L.C.

(57) ABSTRACT

Disclosed herein are method, system, and computer product embodiments for generating a graphical user interface (GUI) to visually represent a programmatic process with various process objects. This may also include interacting with interfaces of the GUI to update the programmatic process. Process objects may contain a hierarchy of functions. Through interaction with the GUI registration interface a process object may be modified such that the hierarchy of functions is changed. Additional process objects may be defined based on a hierarchy of functions. The GUI may also include an analysis interface which may display timing data associated with execution of the programmatic process.

20 Claims, 11 Drawing Sheets

(51) Int. Cl.
*G06F 8/38* (2018.01)
*G06F 9/451* (2018.01)
*B25J 9/16* (2006.01)
*G06Q 10/10* (2023.01)
*H04L 9/40* (2022.01)
*H04L 67/02* (2022.01)
*H04M 3/28* (2006.01)
*H04N 21/443* (2011.01)

(52) U.S. Cl.
CPC ... *B25J 9/1605* (2013.01); *G05B 2219/50391* (2013.01); *G06Q 10/10* (2013.01); *H04L 63/061* (2013.01); *H04L 67/02* (2013.01); *H04M 3/28* (2013.01); *H04N 21/4431* (2013.01)

(56) References Cited

U.S. PATENT DOCUMENTS

| | | | |
|---|---|---|---|
| 9,800,603 B1 | 10/2017 | Sigagni | |
| 10,133,650 B1 | 11/2018 | Park et al. | |
| 10,901,880 B1 | 1/2021 | Bernard et al. | |
| 11,132,278 B2 | 9/2021 | Joyce et al. | |
| 11,379,348 B2 | 7/2022 | Sathianarayanan et al. | |
| 11,409,642 B2 | 8/2022 | Park et al. | |
| 11,693,923 B1 * | 7/2023 | Pallikonda | G06F 9/451 706/12 |
| 2004/0205772 A1 | 10/2004 | Uszok et al. | |
| 2004/0225629 A1 | 11/2004 | Eder | |
| 2006/0075024 A1 * | 4/2006 | Zircher | G06Q 10/10 709/205 |
| 2015/0121367 A1 | 4/2015 | Black | |
| 2015/0128103 A1 | 5/2015 | Stratton et al. | |
| 2016/0044380 A1 * | 2/2016 | Barrett | H04N 21/4431 725/53 |
| 2016/0124742 A1 | 5/2016 | Rangasamy et al. | |
| 2017/0048170 A1 * | 2/2017 | Smullen | H04L 67/02 |
| 2017/0357638 A1 | 12/2017 | Schlesinger et al. | |
| 2018/0034754 A1 * | 2/2018 | Kulkarni | H04M 3/28 |
| 2018/0107461 A1 * | 4/2018 | Balasubramanian | G06F 8/38 |
| 2018/0121309 A1 | 5/2018 | Tabak et al. | |
| 2018/0352002 A1 * | 12/2018 | Ramachandran | H04L 63/061 |
| 2019/0021740 A1 | 1/2019 | Reynolds | |
| 2019/0034957 A1 | 1/2019 | Koryakin et al. | |
| 2019/0066018 A1 | 2/2019 | Sethi et al. | |
| 2019/0171513 A1 | 6/2019 | Purushothaman | |
| 2019/0180746 A1 | 6/2019 | Diwan et al. | |
| 2020/0108500 A1 | 4/2020 | Murthy et al. | |
| 2020/0159648 A1 | 5/2020 | Ghare et al. | |
| 2020/0238514 A1 | 7/2020 | Chinnasamy et al. | |
| 2021/0042207 A1 | 2/2021 | Joyce et al. | |

* cited by examiner

BOT FACTORY ENVIRONMENT

CROSS-REFERENCE TO RELATED APPLICATIONS

This application is a continuation of U.S. patent application Ser. No. 16/261,013, filed Jan. 29, 2019, which is hereby incorporated by reference herein in its entirety.

FIELD

The present disclosure generally relates to systems and methods for authoring and distributing process automation across an enterprise environment.

BACKGROUND

Large data sets may exist in various sizes and organizational structures. With big data comprising data sets as large as ever, the volume of data collected incident to the increased popularity of online and electronic transactions continues to grow. For example, billions of records (also referred to as rows) and hundreds of thousands of columns worth of data may populate a single table. The large volume of data may be collected in a raw, unstructured, and undescriptive format in some instances. Complex manipulations are often required to extract data variables and metrics of value from large data sets. Data variables resulting from complex data transformations may be central to deriving valuable insight from data driven operation pipelines. Additionally, insights may be gained from functional linkages between operational data. Traditionally, such manipulations or processes are authored on a custom or one-off basis and in a text-based development environment. As a result, script development and data analysis may be difficult and time consuming, while tending to benefit of specialized training. Additionally, implementations may be non-standard tending to increase processor utilization and runtime conflicts.

SUMMARY

In various embodiments, systems, methods, and articles of manufacture (collectively, the "system") for a bot factory environment are disclosed. In various embodiments, the system may receive a graphical process model. The system may compile a bot based on the graphical process model. The system may validate the bot to generate a validated bot. The system may register the validated bot to a registry table and may deploy the validated bot to a runtime environment.

In various embodiments, the system may display a configuration frame. The system may receive a nanobot configuration data from the configuration frame. The system may configure a nanobot based on the nanobot configuration data. The system may validate the nanobot to generate a validated nanobot. The system may register the validated nanobot to the registry table. In various embodiments, the system may populate a library frame of a composer module with at least one of a plurality of process objects, a starting event node, an ending event node, or a control node, wherein, the plurality of process objects are associated with the registry table, and wherein at least one of the plurality of process objects is associated on a one-to-one basis with one of the validated nanobot or validated bot. In various embodiments, the system may receive a create schedule command. The system may query the registry table for the validated nanobots and the validated bots. The system may display an editing pane populated based on the validated nanobots and the validated bots. The system may receive a schedule type data and a schedule configuration data from the editing pane, wherein the schedule configuration data is associated with the schedule type data. The system may generate a scheduled bot based on the schedule type data, the schedule configuration data.

In various embodiments, the system may package the scheduled bot for deployment to a runtime environment to generate a deployable bot. The system may associate the deployable bot with a job ID of a job queue table. The system may send the deployable bot to the runtime environment in response to the schedule type data and the schedule configuration data. In various embodiments, the system may execute the deployable bot in the runtime environment. The system may generate runtime data associated with the deployable bot. The system may display an analysis pane based on the runtime data. In various embodiments, the schedule configuration data includes a schedule time flag and a calendar data.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

In general, the system may provide a greater level of sophistication and/or control for enterprise environments. For example, persistent scripts, APIs, web services, programs, and/or the like (i.e. bots) may be one-off and custom created to access individual data elements. In this regard, constructing novel enterprise assets, data variables, and/or the like may tend to be time consuming or inefficient with regard to computational resources. While prior art systems typically often demand re-creation, re-work, and/or re-formatting of data and/or programmatic elements, the current system may define a standardized set of elements and a visual development environment. As such, the system may eliminate or reduce re-work, improve development time, along with enabling relatively low-skilled bot authorship.

The system may also reduce the cost of development or system processing time for bots, reduce network utilization, and/or reduce data storage overhead. The system may increase data reliability or accuracy by enabling standardization of bots between deployment environments (e.g., endpoints). The system may also reduce redundant bot operations requests, thereby reducing a demand for system resources. The system may simplify data mining and enhance the user experience by decreasing the number of user interactions (e.g., duplicate entry requests).

Benefits of the present disclosure may apply to any suitable integrated data environment. For example, the present disclosure may apply in financial reporting contexts, as well as in information requests or fraud prevention contexts.

This process improves the functioning of the computer. For example, decreasing a custom code base increases processing efficiency. Standardized process elements (e.g. bots) tend to enable optimized processing and decrease process debugging time. In this regard, processing errors may be reduced. Similarly, the process increases the reliability and speed of data presentation by enabling pre-deployment validation of processes. In various embodiments, a drag and drop graphical process model is enabled that increases the reliability and speed of process definition and data analysis. By transmitting, storing, and/or accessing data using the processes described herein, the quality of the data is improved and errors are reduced. Such improvements also increase the efficiency of the network by reducing the portion of duplicated processes and data requests. In various embodiments, linking and storing processes based on standardized graphical process models significantly reduce back end processing and reduce processing time for component processes. In various embodiments, the processes may increase network availability by reducing front end and back end process calls. As such, the processes may save processing resources including CPU time, memory resources, and/or network resources.

Figure 1:
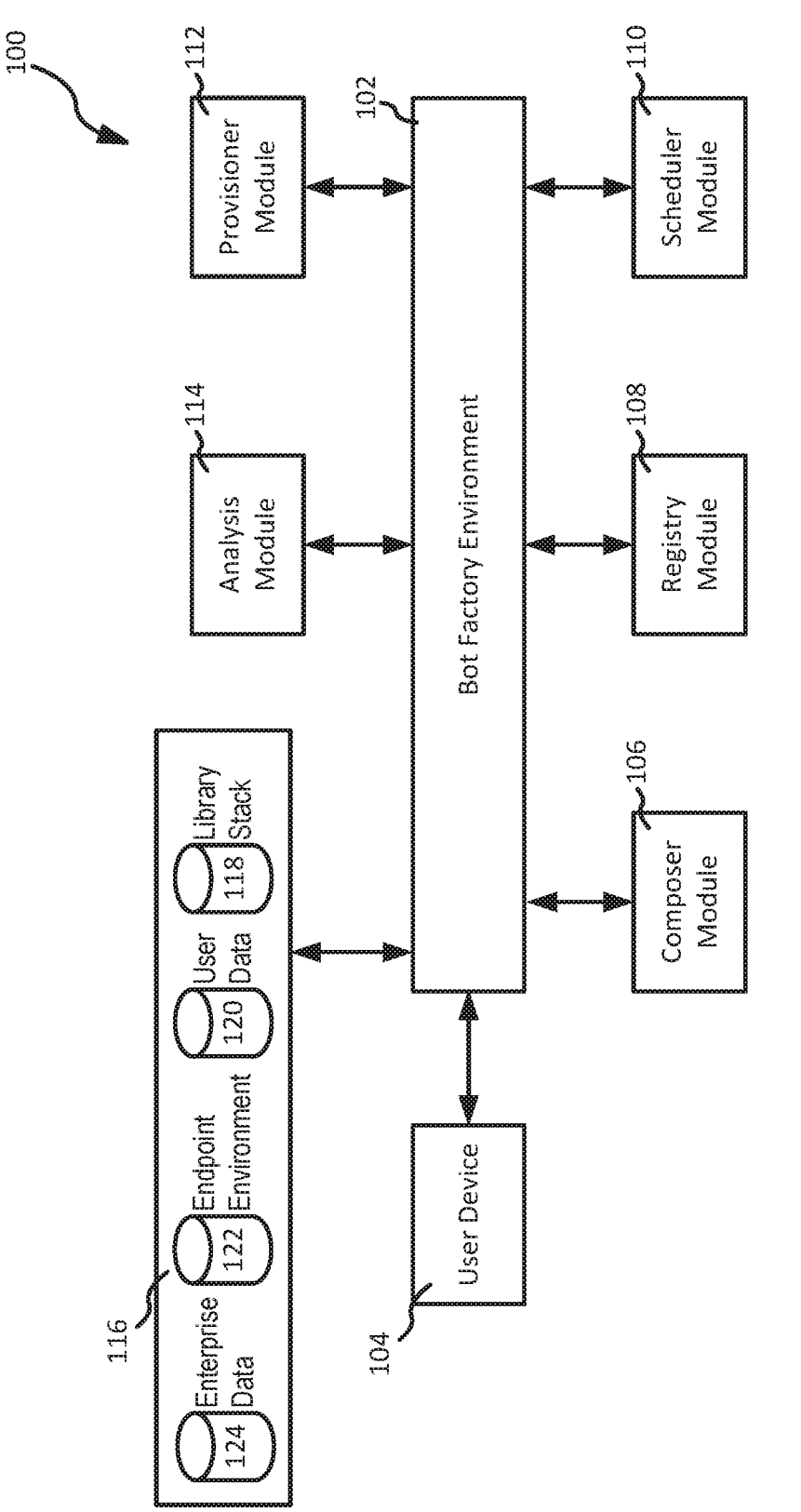
FIG. 1 is a block diagram illustrating various system components of a bot factory environment, in accordance with various embodiments.

In various embodiments, and with reference to FIG. 1, a system 100 may comprise one or more of a bot factory environment 102, a user device 104, a composer module 106, a registry module 108, a scheduler module 110, a provisioner module 112, an analysis module 114, and a database 116. Any of these components may be outsourced and/or be in communication with bot factory environment 102 via a network.

System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein.

In various embodiments, bot factory environment 102 may be configured as a central network element or hub to access various systems, engines, and components of system 100. Bot factory environment 102 may comprise a network, computer-based system, and/or software components configured to provide an access point to various systems, engines, and components. Bot factory environment 102 may be in operative and/or electronic communication with the user device 104, the composer module 106, the registry module 108, the scheduler module 110, the provisioner module 112, the analysis module 114, and the database 116. In this regard, the bot factory environment 102 may allow communication from user device 104 and database 116 to systems, engines, and components of system 100.

In various embodiments, user device 104 may comprise software and/or hardware in communication with bot factory environment 102 via a network comprising hardware and/or software configured to allow a transaction account owner, a user, and/or the like, access to bot factory environment 102. User device 104 may comprise any suitable device that is configured to allow a user to communicate with a network and bot factory environment 102. User device 104 may include, for example, a personal computer, personal digital assistant, cellular phone, kiosk, and/or the like and may allow a user to transmit voice communications.

In various embodiments, database 116 may include any number of data structures or data elements such as a library stack 118, user data 120, endpoint environment data 122, and/or enterprise data 124. Database 116 may be configured to maintain library stack data 118 such as, for example, data related to bot construction and registration such as the bot code base, library objects, bot registry and/or registry objects, unique identifiers, compiler objects, version information, and/or the like. Database 116 may be configured to maintain user data 120 such as, for example, data relating to a user, for example, bot authorship data, user permissions, user identity data, and/or the like. Database 116 may be configured to maintain endpoint environment data 122 such as, for example, runtime environment data and/or data related to bot deployment. Database 116 may be configured to maintain enterprise data 124 such data relating to a customer (e.g., customer data records) such a card member name and address, a card member identifier, a card member vintage, a card member account identifier, a card account vintage, a card product identifier, a card member domicile, a card issuer country, market, or legal entity, a channel, a client identifier, the transaction identifier, an amount billed to the card member for each transaction, an adjustment code, an adjustment description, an adjustment amount, an adjustment currency, a remittance type, a remittance description and name, a remittance date, a remittance amount, a remittance currency, and/or the like. In various embodiments, database 116 may maintain user data in a transient manner. For example, user data may be maintained by database 116 for a bot process duration and may be purged upon completion of the bot process (e.g., stepwise state maintenance).

Enterprise data 124 may include spend and non-spend data such as, for example, a cash advance amount, an annual card fee, a finance charge, interest fees, insurance fees, service fees, a fee type code, a fee description and name, a fee amount, a fee currency, a fee effective date, and/or the like. Enterprise data 124 may include data related transactions and/or a merchant such as, for example, a card account number, a merchant identification, a merchant name and address, a merchant channel, a merchant domicile, an acquirer country, a transaction identifier, a merchant settlement amount and the currency, a foreign exchange fee, a date of the charge, a transaction date, a transaction processing date, a discount revenue earned on the transaction, a merchant adjustment code, a merchant adjustment description, a merchant adjustment amount, a merchant adjustment currency, and/or the like.

Figure 5:
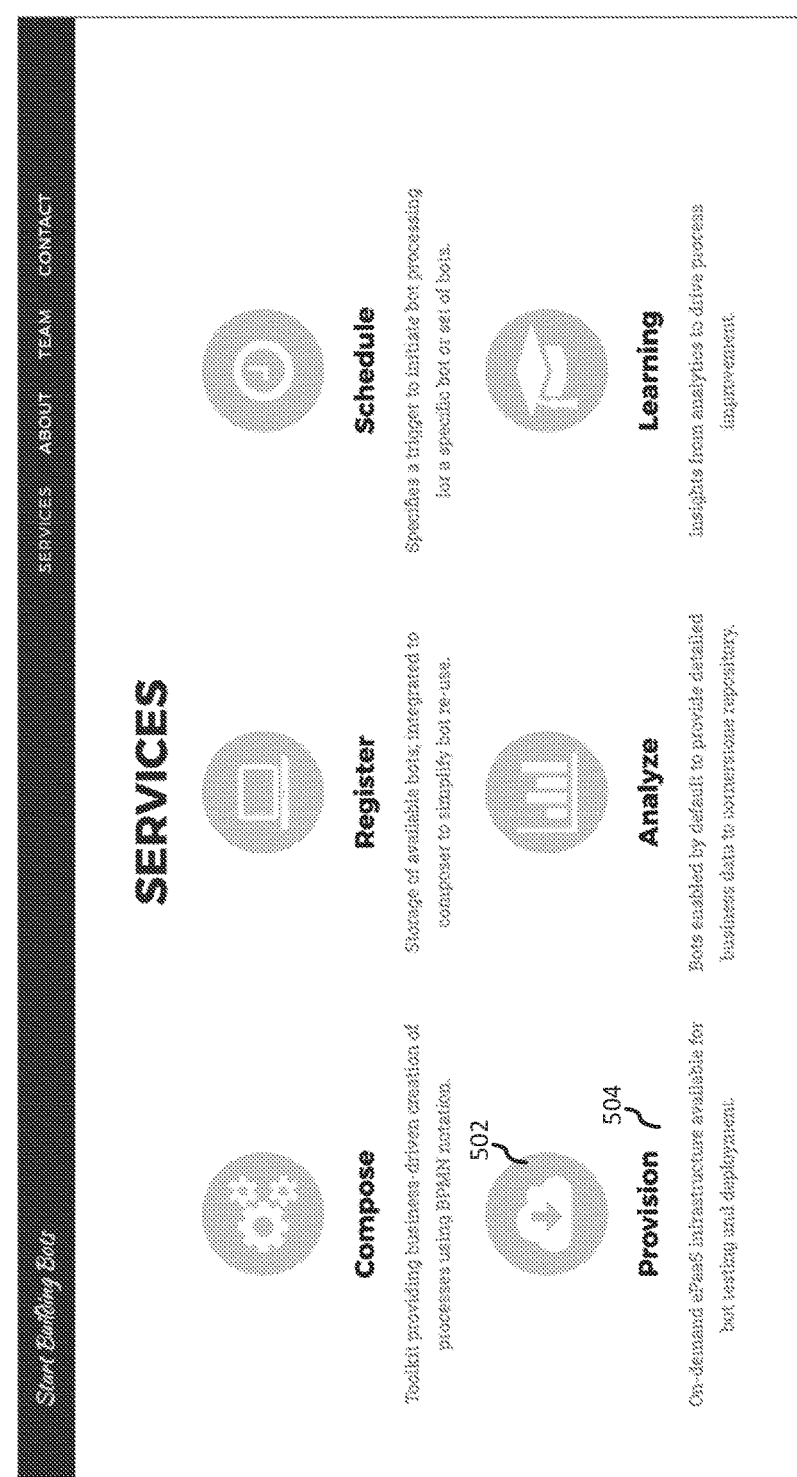
FIG. 5 illustrates a landing page of a bot factory environment, in accordance with various embodiments.

In various embodiments, the composer module 106 may include a GUI interface to the various systems, modules, and engines of system 100. Composer module 106 may be in operative and/or electronic communication with user device 104, the registry module 108, the scheduler module 110, the provisioner module 112, the analysis module 114, and the database 116. In this regard, the composer module 106 may allow communication from user device 104 to systems, engines, and components of system 100. In various embodiments, and with additional reference to FIG. 5, a landing page 500 of the composer module 106 GUI is illustrated. A plurality of icons 105 may provide links between a plurality of module interface pages associated with the various systems, modules, and engines of system 100. Icons 502 may be associated on a one-to-one basis with each of the composer module 106, the registry module 108, the scheduler module 110, the provisioner module 112, and/or the analysis module 114. Each icon 502 may include a unique pictogram associated with the respective module. Landing page 500 may include descriptions 504 associated with the respective module.

The composer module 106 may be configured to enable a user to author, register, schedule and/or deploy a plurality of bots (e.g., microbots, and macrobots). The registry module 108 may be configured to configure, register, and/or validate nanobots. In various embodiments, nanobots, microbots, and macrobots are descriptive of a hierarchical organization of programmatic artefacts in the bot factory system 100. A nanobot may represent the relatively lowest level hierarchical artefact and may be a single unit of work item which may enable access to an element of enterprise data 124. A microbot may comprise multiple nanobots and may leverage and/or coordinate the nanobots in a self-contained process (e.g., a reusable subprocess). In various embodiments, a macrobot may represent the highest level hierarchical artefact. A macrobot may comprise a plurality of nanobots and/or microbots organized into a programmatic process flow which may be packaged and deployed to a runtime environment. A macrobot may define a discrete set of inputs and outputs and a plurality of macrobots may be chained to define a process. In various embodiments, the registry module 108 may be configured to maintain a list (i.e., a registry) of the plurality of bots and may associate each of the plurality of bots with library stack data 118.

Figure 6:
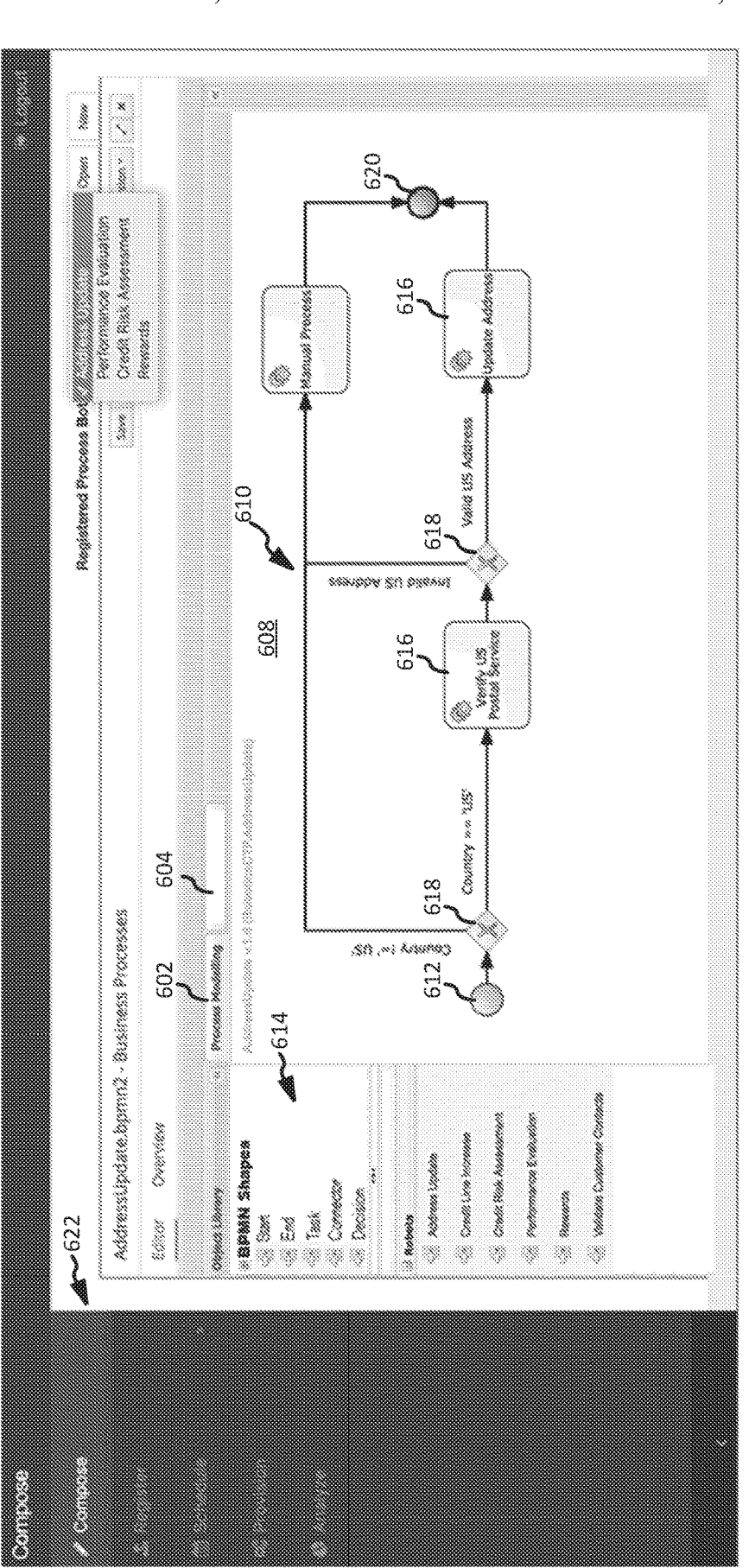
FIG. 6 illustrates an interface page of a bot factory environment, in accordance with various embodiments.

In various embodiments, and with additional reference to FIG. 6, interface page 600 for composer module 106 is illustrated showing having process modeling tab 602 selected. System 100 may create a bot project in response to a new project request. The system may store the bot project as library stack data 118. Additional tabs such as, for example, a simulation second tab 604 may be selected. In response to selecting process modeling tab 602, tab frame 608 displays a graphical process model 610 such as, for example, a flow chart. A user may construct a graphical process model to define a new programmatic process by selecting a starting event node 612 from the object library set displayed in library frame 614. The starting event node 612 may be displayed in tab frame 608. In like regard, process objects 616 associated with one of a nanobot, a microbot, and/or a macrobot may be selected from the library frame 614 and placed within tab frame 608 (e.g., a drag and drop style interface). In various embodiments, each of the process objects may be associated on a one-to-one basis with the plurality of bots registered by registry module 108. In this regard, the library frame 614 may be populated in response to registering a bot. The process objects 616 may be connected by a plurality of control nodes 618 selected from the object library displayed in library frame 614 build graphical process model 610. Similarly, an ending event node 620 may be selected and placed within the tab frame 608 to complete graphical process model 610. In this regard, the graphical process model 610 may define a programmatic process flow comprising any number of process objects, starting event, ending event, and control nodes.

In various embodiments, the second tab may comprise a custom tab such as, for example, a process documentation tab. A user may select the process documentation tab and, in response, tab frame 608 may display process documentation related to the graphical process model 610. The process documentation display may include input fields for data and/or text related to graphical process model 610 such as, for example, a process description, a list of inputs, and/or the like. System 100 may save the graphical process model 610 as library stack data 118. In various embodiments, a user may navigate between one or more module interface pages via navigation frame 622.

Figure 7A:
FIG. 7A illustrates an interface page of a bot factory environment, in accordance with various embodiments.

In various embodiments, the registry module 108 may include a GUI interface to the various systems, modules, and engines of system 100. With additional reference to FIG. 7A, an exemplary interface page 700 for registry module 108 is illustrated showing registry table 702. Registry table 702 may display various elements of library stack data 118 related to the plurality of bots registered by registry module 108. Each element may be associated on a one-to-one basis with each of the plurality of bots. Registry table 702 may include name 704, description data 706, bot type 708, version 710, status 712, and last updated 614 data elements. The name 704 data element may be text data such as a bot name. The description 706 may be text data such as a short description of a bot function. The type data 708 may indicate the relative hierarchical position of the bot, i.e. nano, micro, or macro. The version 710 data may indicate a bot version which may increment in response to alteration in the corresponding graphical process model. The status 712 data may indicate a status of a bot such as, active, inactive, passed, and/or the like. The last updated 714 data may include a calendar date and timestamp when the associated bot data and/or process model was last altered. In various embodiments, each of these elements may be sorted within a corresponding column of registry table 702 and may be searched via search bar 716.

Figure 7B:
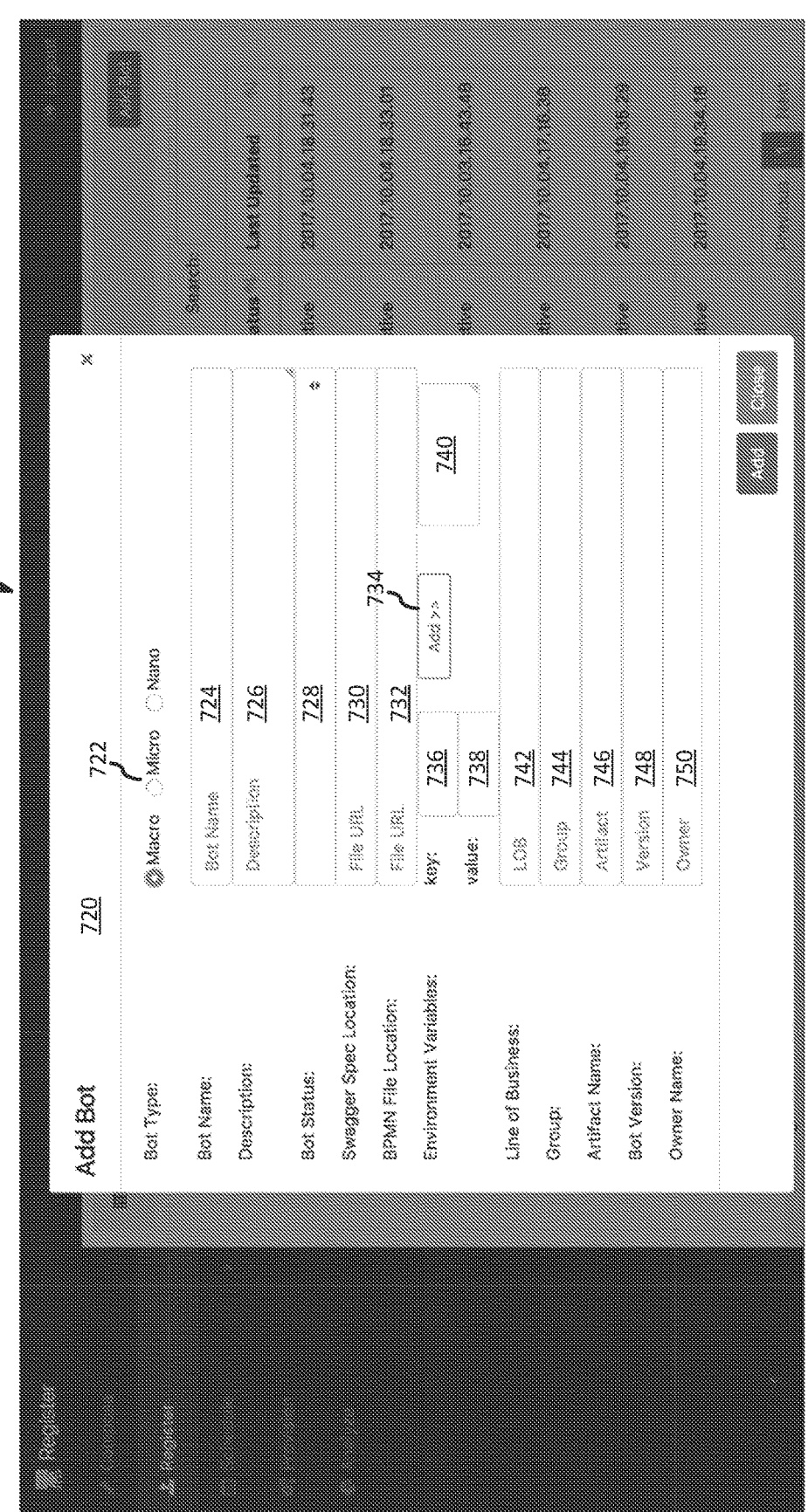
FIG. 7B illustrates an interface page of a bot factory environment, in accordance with various embodiments.

In various embodiments, and with additional reference to FIG. 7B, a configuration frame 720 of registry module 108 interface page 700 is shown. Configuration frame 720 includes a plurality of input fields, menus, buttons, and/or the like to enter configuration data associated with a nanobot, microbot, and/or macrobot. Configuration frame 720 may include bot type buttons 722 associated with each bot type. A bot name field 724 may set the name 704 data element. A bot description field 726 may set the description data 706 element. A bot status dropdown 728 may set the status 712 data. In various embodiments a spec location field 730 and a file location field 732 may be provided. Configuration frame 720 may include an environment variable add button 734 which may set a plurality of environment variables based on a key field 736 and a value field 738. The environment variables may be displayed in the environment variables frame 740. A Line of Business (LOB) field 742 may set a LOB data element and a group field 744 may set a group data element. An artifact name field 746 may set an artifact name data element. In various embodiments, the library frame 614 may display the artifact name data element associated with each of the plurality of registered bots. A bot version field 748 may set the version 710 data element. An owner field 750 may set an owner data element.

Figure 2:
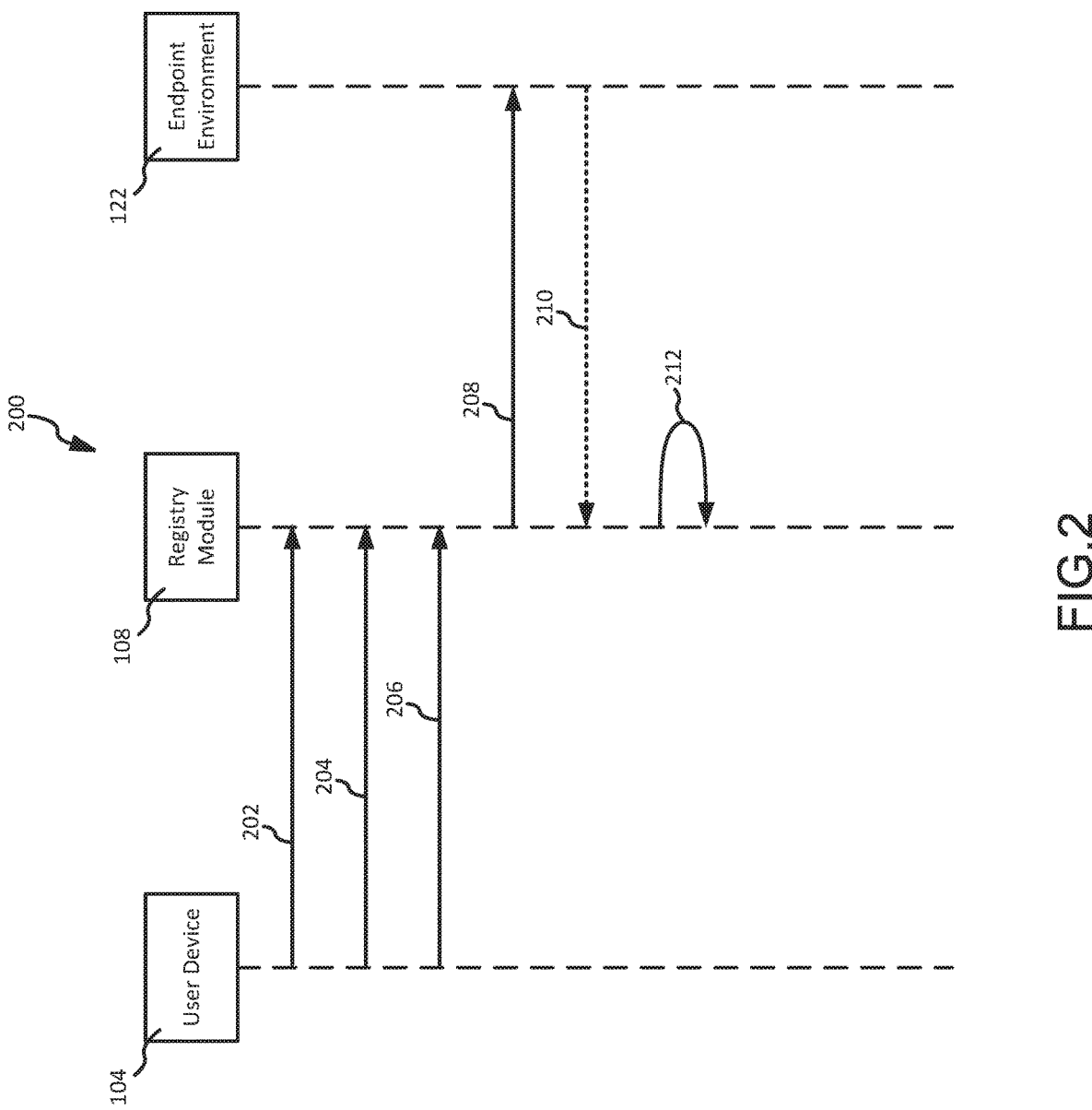
FIG. 2 illustrates a process flow for nanobot registration a in bot factory environment, in accordance with various embodiments.

In various embodiments and with additional reference to FIG. 2, a process flow 200 for adding a nanobot to registry table 702 of registry module 108 is illustrated. Registry module 108 may receive a request to register a nanobot from user device 104 (step 202). The user may select the add bot button 718 of interface page 700 and system 100 may generate the request to register a nanobot in response. Registry module 108 may prompt user device 104 for nanobot configuration data and, in response, may receive the nanobot configuration data from the user device 104 (step 204). Step 204 may include displaying configuration frame 720 and receiving inputs from configuration frame 720. Step 204 may include registry module 108 configuring the nano-bot based on the configuration data. In various embodiments, registry module 108 may save the nanobot as library stack data 118 (step 206). Step 206 may include transmitting a configuration status message to user device 104 and/or a save prompt. The configuration status may indicate, for example, a successful configuration or a configuration error. Step 206 may include user device 104 commanding registry module 108 to save the nanobot to the registry table 702. In various embodiments, registry module 108 may validate the nanobot (step 208). Step 208 may include calling one or more nanobot endpoints of endpoint environment 122. End-point environment 122 may return a validation message for each of the one or more nanobot endpoints called by registry module 108 (step 210). For example, the validation message may indicate whether the associated endpoint is valid, inactive, or may indicate an error condition. Registry mod-ule 108 may validate the nanobot when each of the valida-tion messages indicate valid nanobot endpoints to generate a validated nanobot. In response to validating the nanobot, registry module 108 may save the validated nanobot to the registry (step 212). Step 212 may include registry module 108 adding the validated nanobot to the registry table 702 and associating the table data with the library stack data 118.

Figure 3:
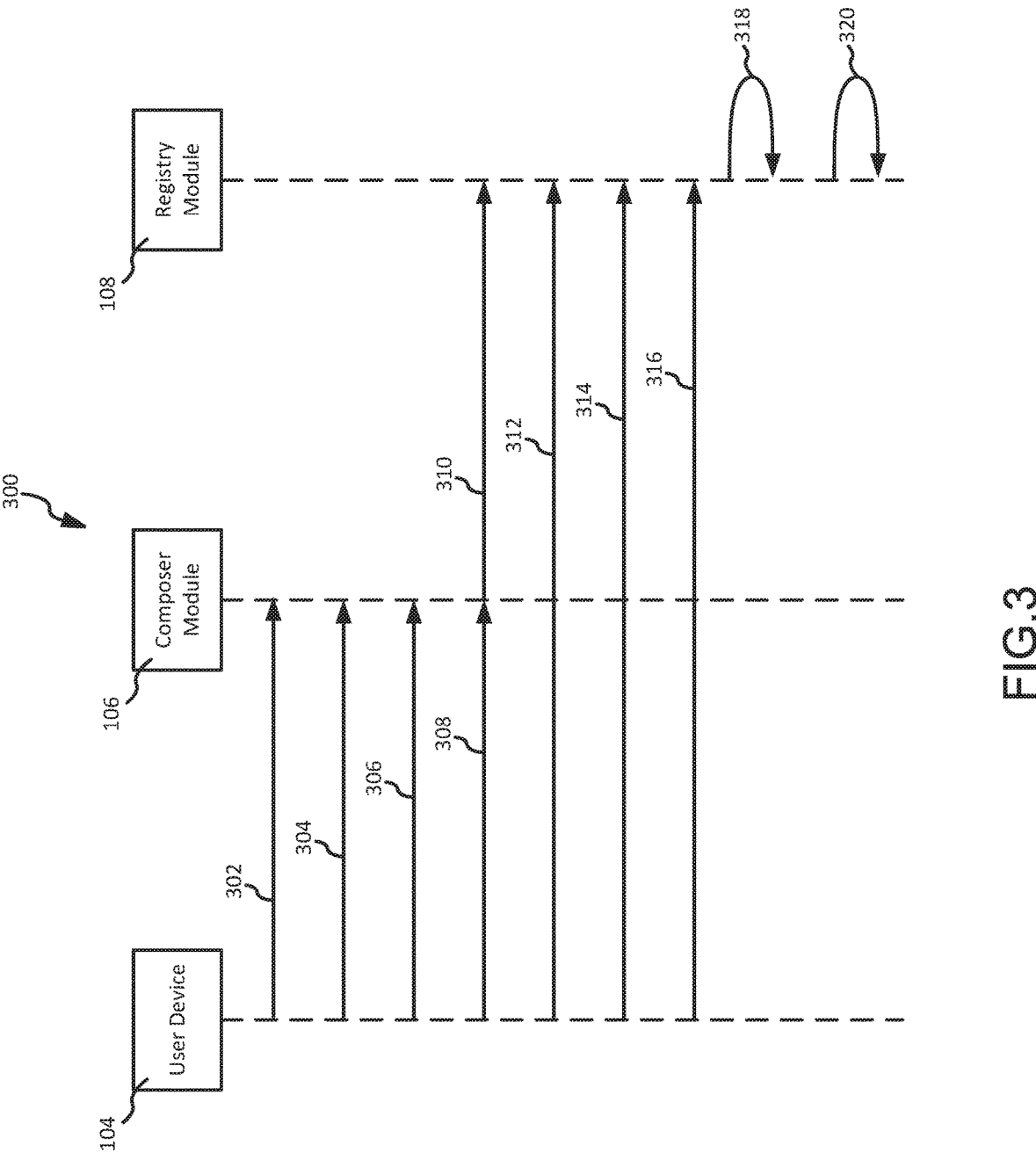
FIG. 3 illustrates a process flow for creating a bot in bot factory environment, in accordance with various embodiments.

With reference again to FIG. 6, and with additional reference to FIG. 3, a process flow 300 for creating a bot is illustrated in accordance with various embodiments. Com-poser module 106 may receive a new project request from user device 104 and may create a bot project in response (step 302). Step 302 may include composer module 106 prompting user device 104 for project data such as, for example, a project name. Composer module 106 may receive a graphical process model from the user device 104 (step 304). Step 304 may include composer module 106 retrieving library stack data 118 from database 116 and registry table 702 data from registry module 108 to populate library frame 614. Step 304 may include selecting (from library frame 614) and positioning any number of process objects 616, starting event nodes, 612, control nodes 618, and/or ending event nodes 620 within tab frame 608. Com-poser module 106 may store the graphical process model in response to a request from user device 104 (step 306). Composer module 106 may store the graphical process model in database 116 as library stack data. Composer module 106 may receive a request to register a bot from user device 104 (step 308).

Composer module 106 may command registry module 108 to begin a registration process (step 310). Step 310 may include composer module 106 compiling programmatic pro-cesses (i.e. the bot) based on the graphical process model and passing the compiled bot to the registry module 108.

Registry module 108 may prompt user device 104 for a bot type input and may receive the bot type input (i.e., macrobot or microbot) from user device 104 (step 312). Registry module 108 may prompt user device 104 for bot configu-ration data and, in response, may receive the bot configu-ration data from the user device 104 (step 314). Step 314 may include displaying configuration frame 720 and receiv-ing any of the input data from configuration frame 720. Step 314 may include registry module 108 configuring the bot based on the configuration data and the bot type input. Registry module 108 may receive a command to validate the bot from user device 104 (step 316). Registry module 108 may validate the bot in response to the command to generate a validation status (step 318). The validation status may indicate an error in validation or a successful validation. For example, step 318 may include returning a validation error to user device 104 in response to the validation status indicating an error in validation. Registry module may register a validated bot in response to a successful validation (step 320). Step 320 may include registry module 108 adding the validated bot to the registry table 702 and associating the table data with the library stack data 118. In this regard, the validated bot may be included in library frame 614 in response to a subsequent new project request.

Figure 4:
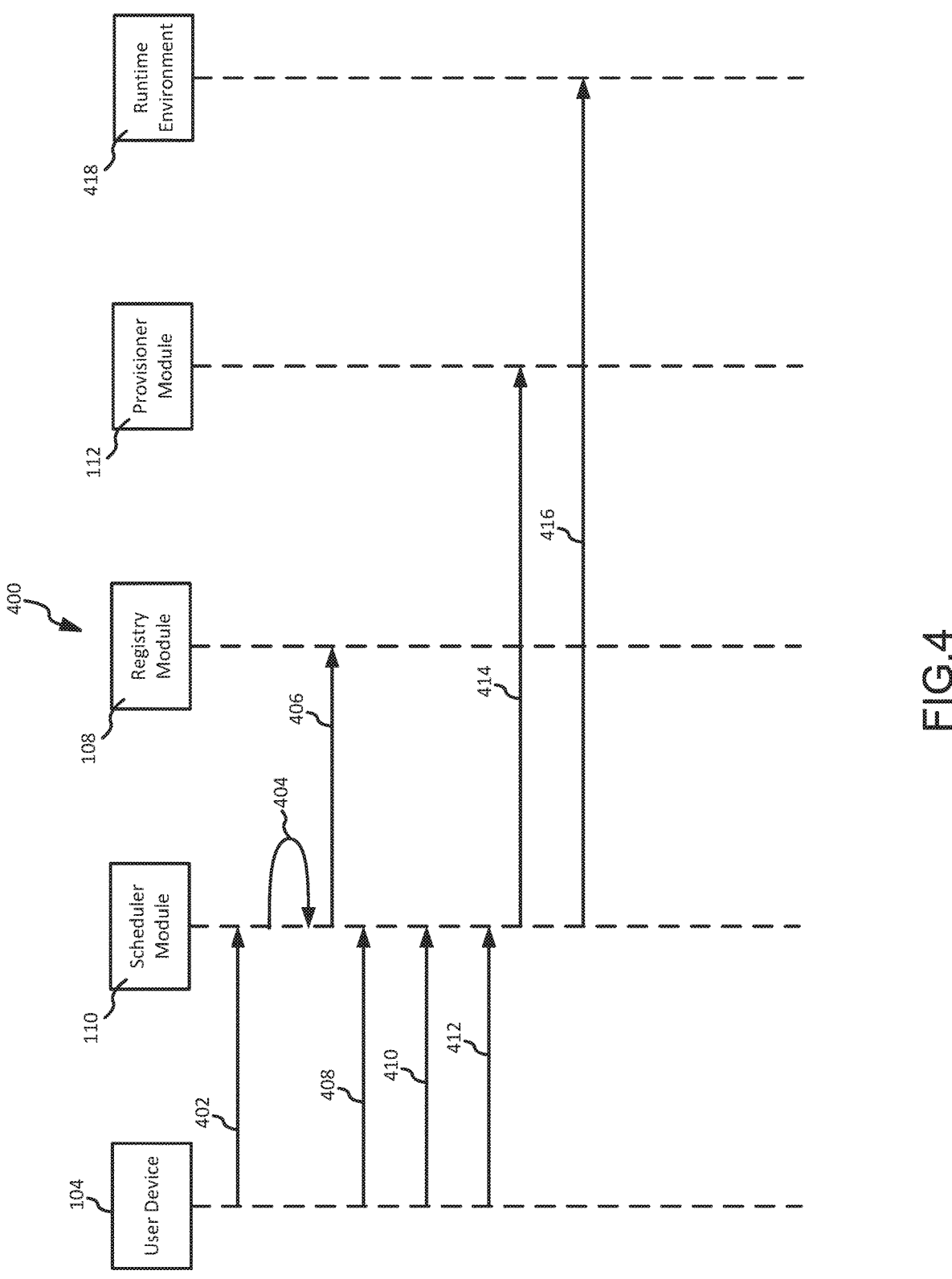
FIG. 4 illustrates a process flow for deploying a bot in a bot factory environment, in accordance with various embodiments.
Figure 8A:
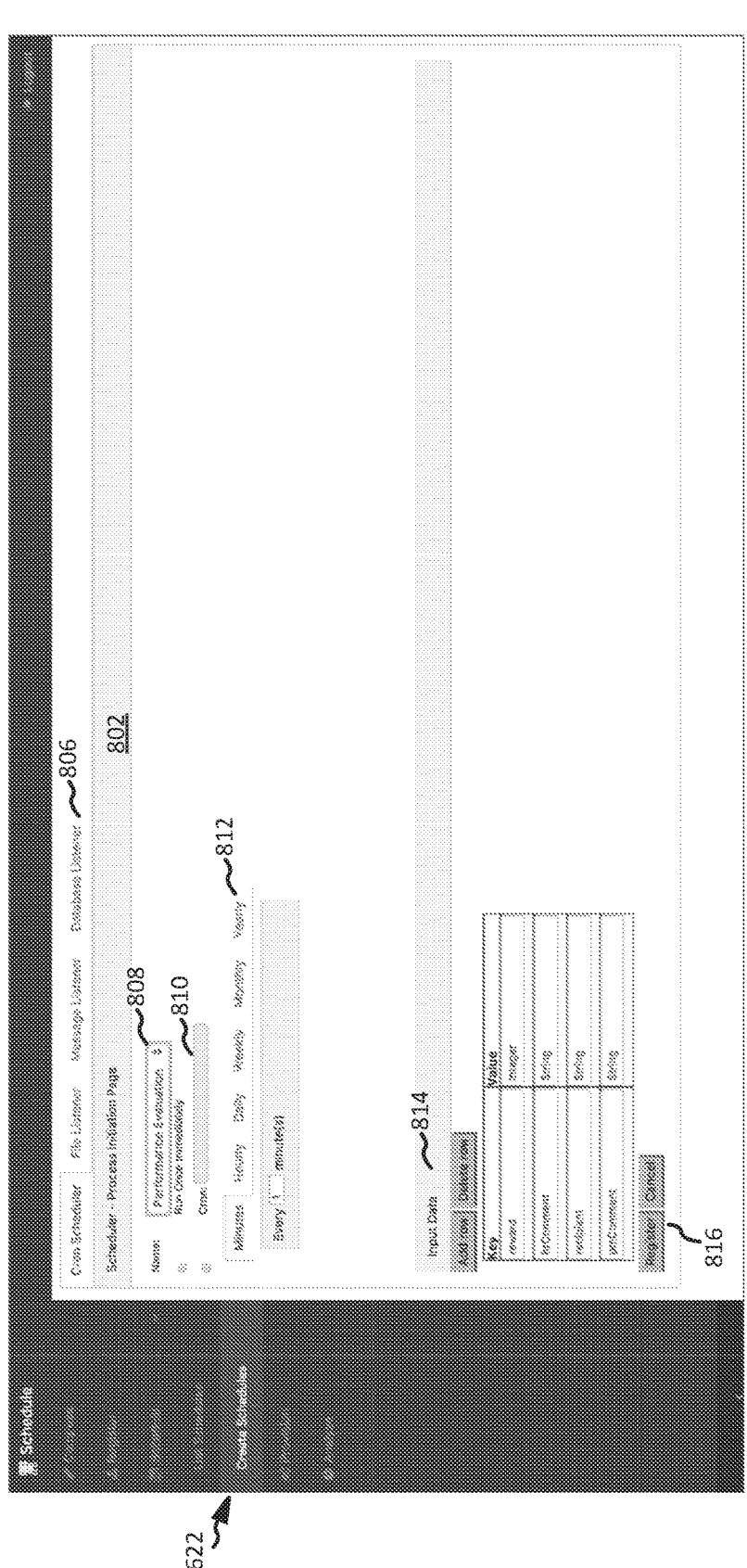
FIG. 8A illustrates an interface page of a bot factory environment, in accordance with various embodiments.
Figure 8B:
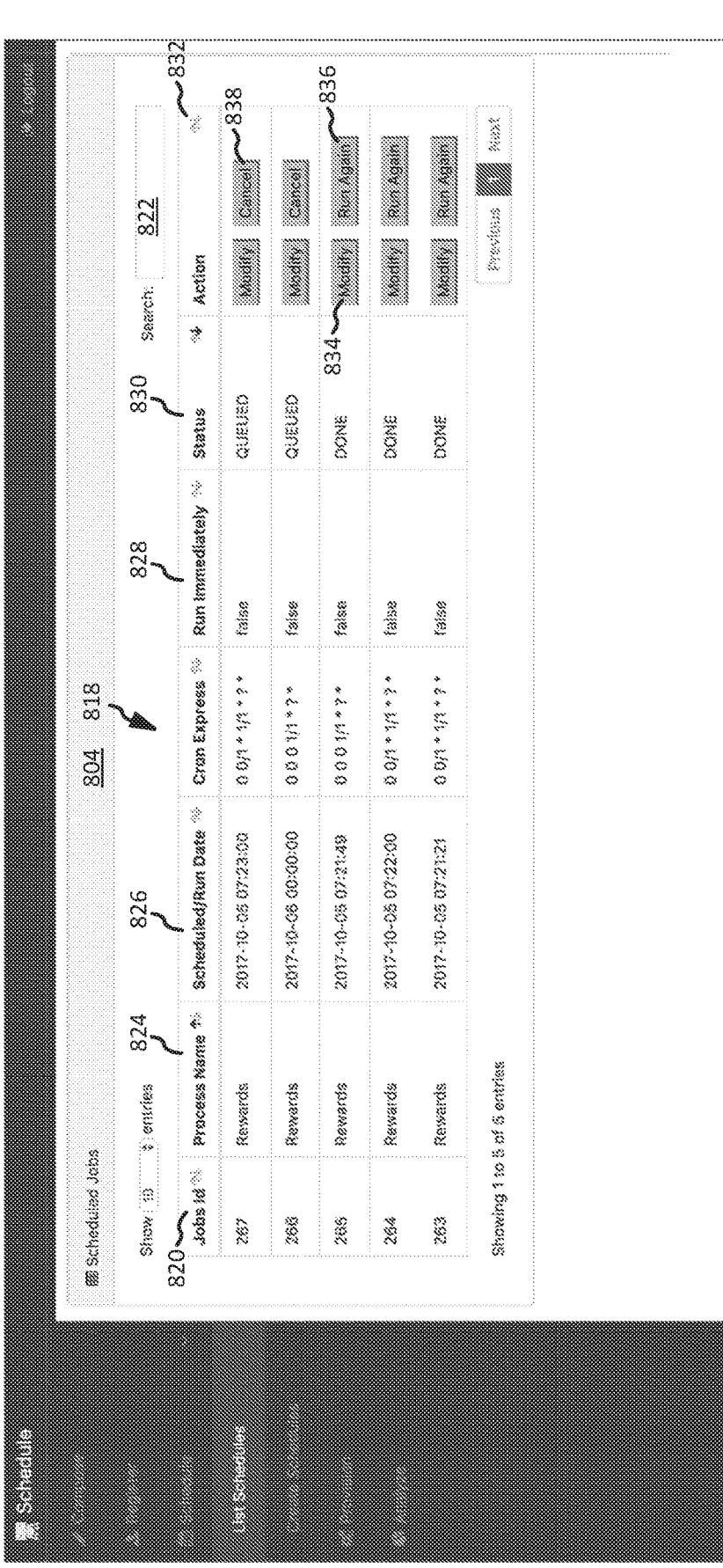
FIG. 8B illustrates an interface page of a bot factory environment, in accordance with various embodiments.

With reference now to FIGS. 4, 8A, and 8B a process flow 400 for deploying a bot is illustrated in FIG. 4 according to various embodiments. Scheduler module 110 may include a GUI interface to the various systems, modules, and engines of system 100. FIG. 8A illustrates interface page 800 of scheduler module 110 showing editing pane 802 and FIG. 8B illustrates interface page 800 showing job queue pane 804 in accordance with various embodiments. Scheduler module 110 may receive a create schedule command from user device 104 (step 402). Step 402 may include selecting the interface page 800 from the navigation frame 622. Step 402 may include displaying the editing pane 802 in response to a user selecting 'create schedules' tab of navigation frame 622. In various embodiments, editing pane 802 may be associated with one or more tabs 806. Each of the tabs 806 may configure editing pane 802 to display menus, buttons, input fields, and/or the like associated with the respective tab. Scheduler module 110 may load validated bots from the database 116 (step 404) and may query registry module 108 for registered bots (step 406). Step 406 may include retiring the registry table 702 data to the scheduler module 110. Step 406 may include populating the bot name dropdown 808 of editing pane 802 based on the registry table 702 data (e.g., displaying names of validated nanobots and validated bots).

Scheduler module 110 may receive schedule type data from user device 104 (step 408). Step 408 may include selecting one of the plurality of tabs 806. Each of the tabs 806 may be associated with a schedule type. For example, a time-based scheduler may be associated with a first tab (i.e., chron scheduler). In another example, a file-based scheduler may be associated with a second tab (i.e., file listener). The file listener may monitor a fixed location on a NAS drive for a transfer of a file into the monitored location. A file may comprise one or more records. In response to the transfer, system 100 may read the file record by record and scheduler module 110 may trigger execution of one instance of a bot for each record.

In another example, a message-based scheduler may be associated with a third tab (i.e., message listener). The message listener may monitor an asynchronous messaging tool such as, for example, MQ or Kafka. The message listener may receive a bot request via the asynchronous messaging tool. The bot request may comprise one or more bot configuration parameters and a bot selection. Scheduler module 110 may configure the selected bot in accordance with the configuration parameters to generate a deployable bot and may send the deployable bot to the runtime environment. In another example, a database-based scheduler may be associated with a fourth tab (i.e., database listener). The database listener may periodically poll database 116 for records and/or requests associated with a bot (i.e., bot records). Bot records may comprise record details associated with a bot selection and bot configuration data. In response to receiving a bot record via the database listener, scheduler module 110 may trigger execution of one instance of a bot defined by the record details of the bot record.

Scheduler module 110 may receive schedule configuration data from user device 104 (step 410). Step 410 may include associating the schedule type data with the schedule configuration data. A Step 410 may include selecting a bot from the bot name dropdown 808. Step 408 may include setting a schedule time flag 810 such as, for example, a 'run once immediately' flag or a 'calendar' flag. Step 410 may include setting calendar data 812 in response to the schedule time flag. For example, calendar data 812 may provide settings of the form 'run ever X minutes' or 'run every 5th day of the month' or 'run every week at midnight' and/or the like. Step 410 may include adding one or more rows of input data 814. Scheduler module 110 may receive a register schedule command from user device 104 (step 412). Step 412 may include selecting the register button 816 of editing pane 802.

In various embodiments, and in response to selecting the register button 816, scheduler module 110 may display the job queue pane 804. Scheduler module 110 may store the schedule type data and associated schedule configuration data as elements of library stack data 118 in database 116 associated with the selected bot from the name dropdown 808 to generate a scheduled bot. Scheduler module 110 may command provisioner module 112 to package the scheduled bot for deployment to a runtime environment and provisioner module 112 may provide a deployable bot to the scheduler module 110 (step 414). Step 414 may include adding the deployable bot to the jobs queue table 818. Step 414 may include associating the deployable bot with a job ID 820 of the jobs queue table 818 Scheduler module 110 may send the deployable bot to the runtime environment 418 in response to schedule type data and the associated schedule configuration data (step 416). For example, scheduler module 110 may send the deployable bot to the runtime environment 418 every 5 minutes where the schedule type is chron scheduler and the associated schedule configuration data includes the calendar flag and calendar data of the form 'run every 5 minutes'.

In various embodiments, jobs queue table 818 may display various elements of library stack data 118 related to the plurality of deployable bots scheduled by scheduler module 110. Each element may be associated on a one-to-one basis with each of the plurality of deployable bots. Each of these elements may be sorted within a corresponding column of jobs queue table 818 and may be searched via search bar 822. Jobs queue table 818 may include job ID 820, process name 824, scheduled run date 826, run type 828, run status 830, and/or actions 832 elements. In various embodiments, process name 824 may display the name 704 data element. The scheduled run date 826 may display the calendar date and time based on the schedule type data and the associated schedule configuration data for a queued run. For a completed run, the scheduled run date 826 may display the calendar date and time the scheduler module 110 passed the associated deployable bot to the runtime environment. Run type 828 may display a status based on the schedule time flag 810. For example, run type 828 may display 'true' where the 'run once immediately' flag is set and otherwise display 'false.' Run status 830 may display 'done' when no further runs of a deployable bot are scheduled or when a run instance has completed. Run status 830 may display 'queued' when a deployable bot is scheduled to be sent to the runtime environment 418.

In various embodiments, actions 832 may be provided for each of the plurality of deployable bots listed in job queue table 818. In response to selecting the modify button 834 associated with a deployable bot, scheduler module 110 may display the editing pane 802 and may populate the editing pane 802 with the schedule type data and the associated schedule configuration data for the deployable bot. In this regard, each of the deployable bots listed in job queue table 818 may be re-scheduled. For those listed having a 'done' run status 830 a run again button 836 is displayed. Selecting the run again button 836 commands scheduler module 110 to re-schedule the associated deployable bot according to the stored schedule type data and associated schedule configuration information. For those listed having a 'queued' run status 830 a cancel button 838 is displayed. Selecting the cancel button 838 removes the scheduled deployable bot from the jobs queue table 818.

Figure 9:
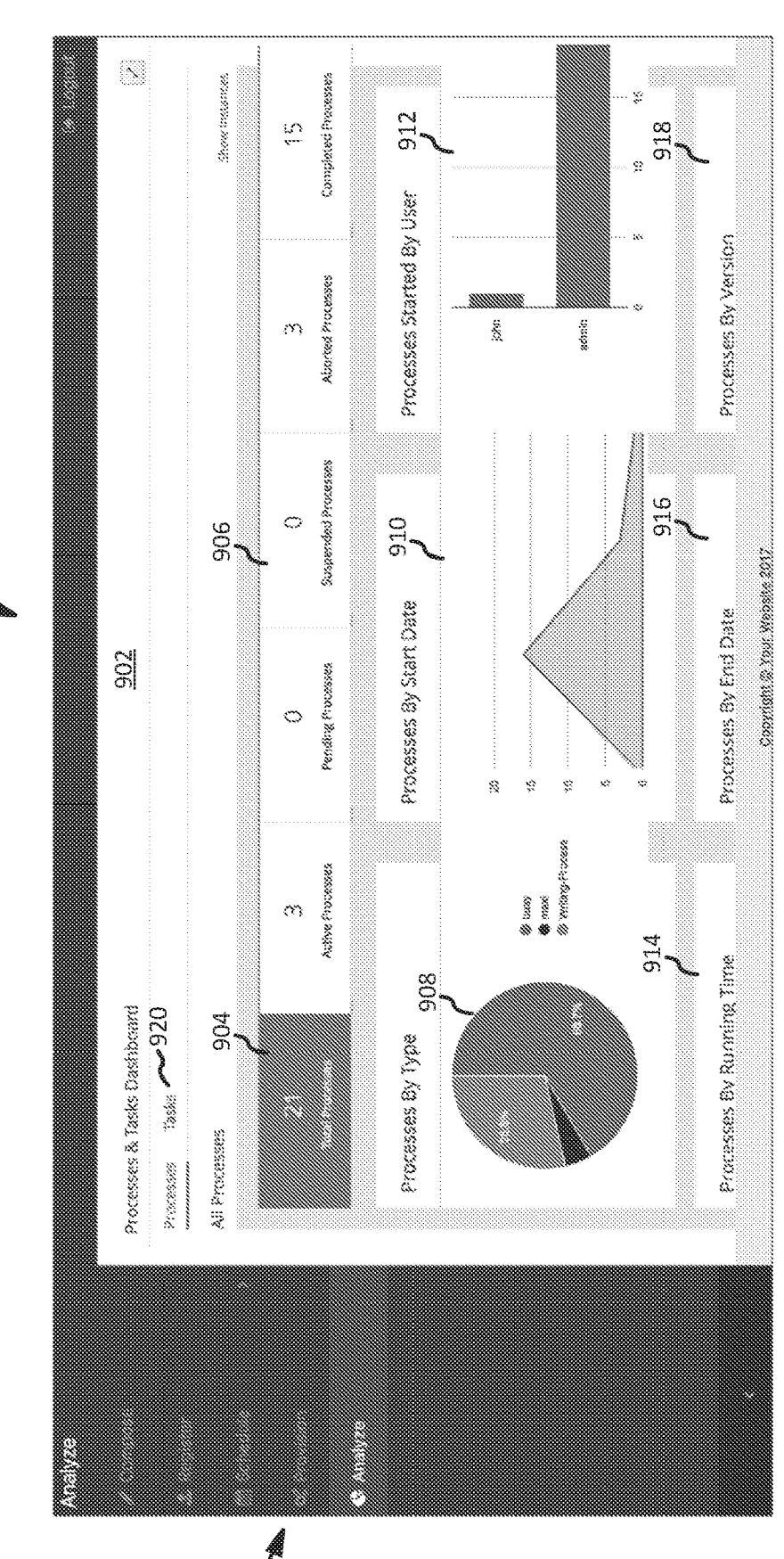
FIG. 9 illustrates an interface page of a bot factory environment, in accordance with various embodiments.

In various embodiments, runtime environment 418 may generate run data in response to receiving and executing the deployable bot. Scheduler module 110 and/or runtime environment 418 may provide the run data to analysis module 114. The analysis module may include a GUI interface to the various systems, modules, and engines of system 100. In various embodiments, FIG. 9 illustrates an interface page 900 of analysis module 114. System 100 may display interface page 900 in response to selecting the 'analyze' tab of navigation frame 622. Analysis pane 902 may be configured to display one or more metrics, analytical elements, and/or the like based on the runtime data and in response to selecting tabs 920. For example, in response to selecting a 'processes' tab, analysis module 114 may determine and display a total processes count 904. The analysis module may categorize the total processes into one or more process states 906 such as, for example, active processes, pending processes, suspended processes, aborted processes and completed processes. Analysis module 114 may generate a plurality of charts based on the run data. For example, analysis pane 902 may display a processes by type 908 chart, a processes by start date 910 chart, a processes started by user 912 chart, a processes by running time 914 chart, a processes by end date 916 chart, a processes by version 918 chart, and/or the like.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

Referring now to FIGS. 2-9, the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2A-5, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID' operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multi-threaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, NY) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT' company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

In various embodiments, the system and various components may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOMER system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOMEPOD® systems may also allow the user to access information about eligible transaction accounts linked to an online account across all digital assistant-enabled devices.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

In various embodiments, the server may include application servers (e.g. WEBSPHERE®, WEBLOGIC JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI' software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer pdrotocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communication means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 ® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by My SQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the stand-alone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at www.csrc.nist.gov/publications/nistpubs/800-145/SP800-145 (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nujten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:

generating a graphical user interface (GUI) that includes a graphical process model corresponding to a predefined programmatic process, wherein the GUI further includes a flowchart corresponding to the predefined programmatic process, the flowchart includes one or more process objects, wherein the one or more process objects corresponds with one or more validated bots registered in a registry table;

receiving a selection from a library frame of the GUI that adds a process object from the library frame to the flowchart corresponding to the predefined programmatic process, wherein the selection further adds a validated bot corresponding to the process object to the predefined programmatic process;

generating an updated programmatic process that includes the validated bot corresponding to the process object from the library frame in a sequence with the one or more process objects corresponding to the one or more validated bots;

modifying the flowchart on the GUI to display the updated programmatic process; and executing the updated programmatic process according to the sequence by executing the validated bot and the one or more validated bots corresponding to each of the process objects in the sequence.

2. The method of claim 1, wherein the GUI further includes a navigation frame including a registration interface.

3. The method of claim 1, further comprising:

loading a registration interface in response to receiving a selection from a navigation frame of the GUI;

receiving a selection to add a second validated bot to a second process object in the library frame;

configuring the second validated bot based on configuration data input and the one or more validated bots registered in the registry table; and assigning the second validated bot to the second process object.

4. The method of claim 3, wherein the configuration data is received from a user device.

5. The method of claim 1, further comprising:

validating the validated bot by calling an endpoint of the validated bot; and displaying a validation message indicating a validation status of the validated bot.

6. The method of claim 5, further comprising:

displaying an error message indicating a type of error that occurred during validation, wherein the validation message indicates that an error occurred during the validation.

7. The method of claim 1, wherein the GUI further includes a navigation frame including an analysis interface including a plurality of graphical representations of timing data associated with executing the updated programmatic process.

8. A non-transitory computer-readable medium having instructions stored thereon that, when executed by at least one computing device, cause the at least one computing device to perform operations comprising:

generating a graphical user interface (GUI) that includes a graphical process model corresponding to a predefined programmatic process, wherein the GUI further includes a flowchart corresponding to the predefined programmatic process, the flowchart includes one or more process objects, wherein the one or more process objects corresponds with one or more validated bots registered in a registry table;

receiving a selection from a library frame of the GUI that adds a process object from the library frame to the flowchart corresponding to the predefined programmatic process, wherein the selection further adds a validated bot corresponding to the process object to the predefined programmatic process;

generating an updated programmatic process that includes the validated bot corresponding to the process object from the library frame in a sequence with the one or more process objects corresponding to the one or more validated bots;

modifying the flowchart on the GUI to display the updated programmatic process; and executing the updated programmatic process according to the sequence by executing the validated bot and the one or more validated bots corresponding to each of the process objects in the sequence.

9. The method of claim 8, wherein the GUI further includes a navigation frame including a registration interface.

10. The method of claim 9, further comprising:

loading the registration interface in response to receiving a selection from a navigation frame of the GUI;

receiving a selection to add a second validated bot to a second process object in the library frame;

configuring the second validated bot based on configuration data input and the one or more validated bots registered in the registry table; and assigning the second validated bot to the second process object.

11. The method of claim 10, wherein the configuration data is received from a user device.

12. The method of claim 8, further comprising:

validating the validated bot by calling an endpoint of the validated bot; and displaying a validation message indicating a validation status of the validated bot.

13. The method of claim 12, further comprising:

displaying an error message indicating a type of error that occurred during validation, wherein the validation message indicates that an error occurred during the validation.

14. The method of claim 8, wherein the GUI further includes a navigation frame including an analysis interface including a plurality of graphical representations of timing data associated with executing the updated programmatic process.

15. A system, comprising:

a memory;

at least one processor coupled to the memory and configured to:

generate a graphical user interface (GUI) that includes a graphical process model corresponding to a predefined programmatic process, wherein the GUI further includes a flowchart corresponding to the predefined programmatic process, the flowchart includes one or more process objects, wherein the one or more process objects corresponds with one or more validated bots registered in a registry table;

receive a selection from a library frame of the GUI that adds a process object from the library frame to the flowchart corresponding to the predefined programmatic process, wherein the selection further adds a validated bot corresponding to the process object to the predefined programmatic process;

generate an updated programmatic process that includes the validated bot corresponding to the process object from the library frame in a sequence with the one or more process objects corresponding to the one or more validated bots;

modify the flowchart on the GUI to display the updated programmatic process; and execute the updated programmatic process according to the sequence by executing the validated bot and the one or more validated bots corresponding to each of the process objects in the sequence.

16. The method of claim 15, wherein the GUI further includes a navigation frame including a registration interface.

17. The method of claim 16, further configured to:

load the registration interface in response to receiving a selection from a navigation frame of the GUI;

receive a selection to add a second validated bot to a second process object in the library frame;

configure the second validated bot based on configuration data input and the one or more validated bots registered in the registry table; and assign the second validated bot to the second process object.

18. The method of claim 15, further configured to:

validate the validated bot by calling an endpoint of the validated bot; and display a validation message indicating a validation status of the validated bot.

19. The method of claim 18, further configured to:

display an error message indicating a type of error that occurred during validation, wherein the validation message indicates that an error occurred during the validation.

20. The method of claim 15, wherein the GUI further includes a navigation frame including an analysis interface including a plurality of graphical representations of timing data associated with executing the updated programmatic process.

* * * * *